UNITED STATES PATENT OFFICE.

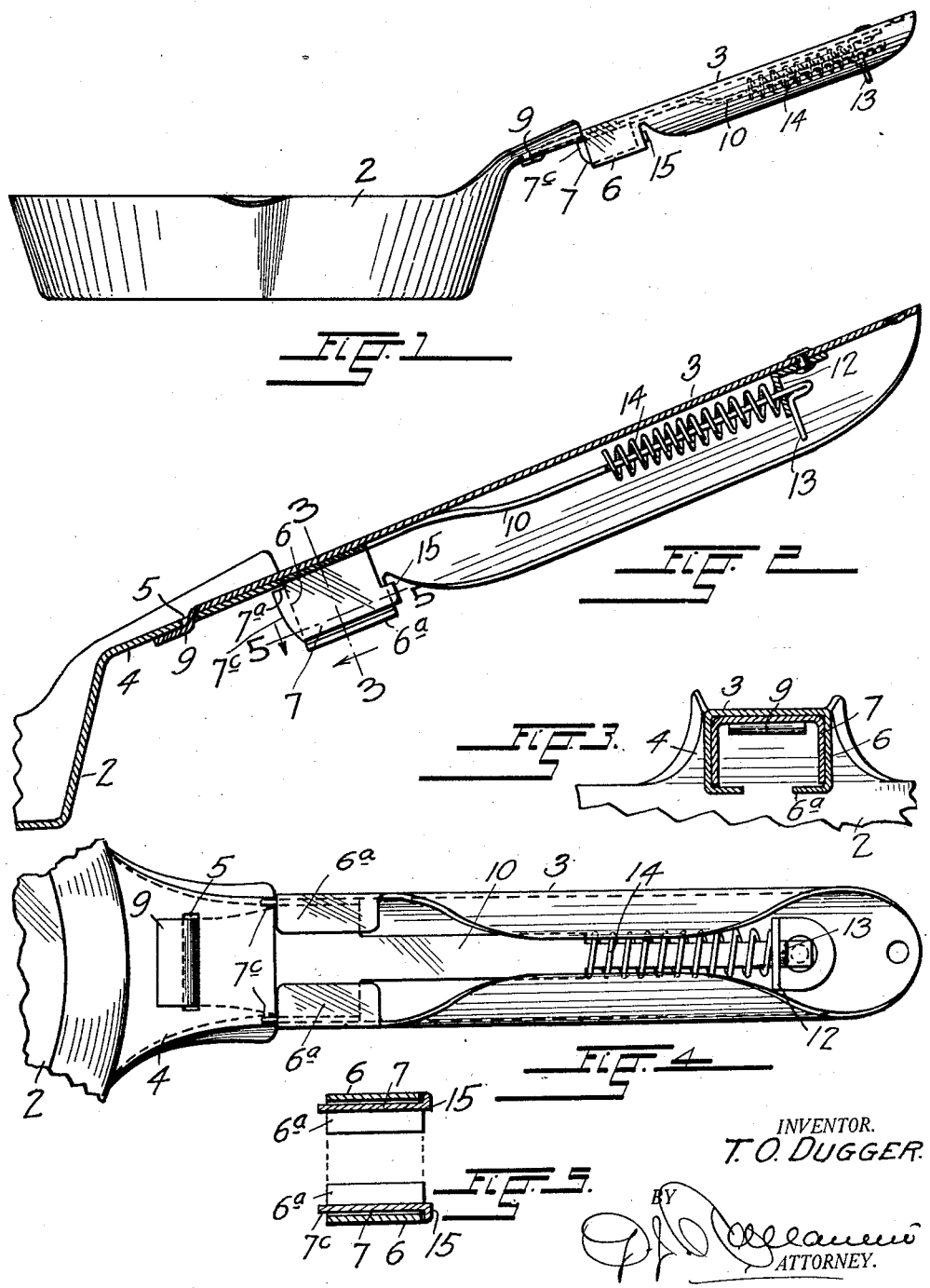

THOMAS O. DUGGER, OF BRIDGEPORT, NEBRASKA.

DETACHABLE HANDLE FOR COOKING UTENSILS.

1,406,826.  Specification of Letters Patent.  Patented Feb. 14, 1922.

Application filed April 6, 1921. Serial No. 459,107.

*To all whom it may concern:*

Be it known that I, THOMAS O. DUGGER, a citizen of the United States, residing at Bridgeport, in the county of Morrill and State of Nebraska, have invented certain new and useful Improvements in Detachable Handles for Cooking Utensils, of which the following is a specification.

This invention relates to cooking utensils and its main object is to provide in connection with utensils of the type used for preparing food by the application of heat, a handle of simple construction which is readily detachable from the utensil while it is on the stove, and as easily replaced to remove the same without danger or discomfort to the user.

Another object of the invention is to provide in a detachable handle for cooking utensils, a fastening which automatically engages the utensil to which the handle is applied and thus avoids the manipulation of hand operated bolts or latches usually employed in devices of this character.

With the above and other objects in view my invention resides in the novel features of construction and arrangement of parts which will hereinafter be fully described with reference to the accompanying drawings wherein similar characters of reference designate corresponding parts throughout the views, and in which—

Figure 1 represents a side elevation of a cooking utensil to which the improved handle is applied;

Figure 2, a longitudinal section of the handle and adjoining part of the utensil, drawn to an enlarged scale;

Figure 3, a section on the line 3—3, Figure 2;

Figure 4, an underneath view of the handle and the part to which it is fastened, and Figure 5, a section taken on the line 5—5, Figure 2.

Referring to the drawings, the reference character 2 designates the cooking utensil, shown for illustrative purposes in the form of a frying pan, and 3 a handle constructed in accordance with the present invention which projects laterally from the rim thereof.

The vessel has for the application of the handle an integral lip 4 extending outwardly from its rim and having a transverse slot 5.

The handle is preferably formed of a strip of sheet metal bent inwardly at its longitudinal edges to form a protective housing for a fastening bolt hereinafter to be described, and to provide at an end of the handle a slideway for the head of the bolt.

The portion of the handle projecting beyond the slideway 6 is offset at its end to form a tongue 9 adapted for insertion in the slot of the lip on the cooking utensil.

The fastening bolt hereinbefore referred to comprises a U-shaped head 7 slidably fitted between the sides of the slideway of the handle and loosely supported upon flanges 6ª extending inwardly at the lower ends thereof.

The head has forwardly extending shoulders 7ª adapted to engage the underside of the lip of the cooking utensil and the front edges of its parallel sides beneath said shoulders are beveled to provide cam faces 7ᶜ which by engagement with the end of the lip during pivotal movement of the handle automatically retract the bolt to bring the shoulders in the locking position.

The head 7 of the bolt is formed at the end of a shank 10 which is slidably supported in a slot of a bracket 12 attached to the handle adjacent the rear end thereof and the end of the shank is bent angularly to provide a thumb piece 13 which limits the forward movement of the bolt by engagement with a side of the bracket.

A spring 14 coiled around the shank and fastened thereto at one of its ends engages the opposite side of the bracket to yieldingly maintain the bolt in its operative position and lugs 15 bent outwardly from the sides of the head 7 limit the forward movement of the bolt by engagement with the sides of the slideway 6.

The handle is applied to the lip by inserting the end of its tongue through the slot 5 so as to pivotally engage an edge thereof.

Upon downward movement of the handle about the pivot thus established, the cam faces 7 of its head are moved in engagement with the end of the lip 4 with the result that the bolt is automatically retracted against the resistance of its spring until it is released, when by forward movement to its original position, the shoulders at its forward end are placed beneath the lip.

It will be seen that in this position of the handle the offset tongue and the shoulders on the bolt cooperate to firmly secure it to the lip of the cooking utensil and that it is readily detached therefrom by retraction of the bolt through the medium of the thumb-piece at the outer end of its shank.

In order to further secure the handle against lateral displacement, the lip 4 is turned upwardly at its sides to engage the portion of the tongue upon its upper surface.

Having thus described my invention what I claim and desire to secure by Letters-Patent is:

1. The combination with a utensil having a slotted lip, of a handle having an offset tongue adapted to pass through the slot of the lip in pivotal relation to an edge thereof, and a spring-pressed bolt cooperating with the tongue to lock the handle on the lip, and having means to automatically move it to its operative position with relation to the lip by pivotal movement of the handle.

2. The combination with a utensil having a slotted lip, of a handle having an offset tongue adapted to pass through the slot of the lip in pivotal relation to an edge thereof, and a spring-pressed bolt cooperating with the tongue to lock the handle on the lip by engagement with the under surface of the same, the bolt having a cam-face engaging with the lip to retract it against the resistance of its spring by pivotal movement of the handle.

3. The combination with a utensil having a slotted lip, of a handle having an offset tongue adapted to pass through the slot of the lip in pivotal relation to an edge thereof, and a spring-pressed bolt having shoulders to engage the under surface of the lip and beneath said shoulders, beveled edges adapted to engage with the forward edge of the same during pivotal movement of the handle.

4. The combination with a utensil having a slotted lip, of a handle having an offset tongue adapted to pass through the slot of the lip in pivotal relation to an edge thereof, and a spring-pressed bolt having a U-shaped head the edges of which have shoulders to engage the under surface of the lip, and are beveled beneath the shoulders to engage with the end of the lip during pivotal movement of the handle.

5. A detachable handle for cooking utensils having a forwardly projecting offset tongue and a spring-pressed bolt slidable on the handle and having a head provided with a forwardly projecting shoulder and a cam face beneath the same.

6. A detachable handle for cooking utensils having a slideway, an offset tongue projecting forwardly thereof, and a slotted lug, a bolt having a shouldered head supported in said slideway, a shank passing through the slot of the lug and having a thumb-piece at its end, and a spring connected to the shank and bearing on the lug.

7. A detachable handle for cooking utensils having a forwardly projecting offset tongue, and a spring-pressed bolt slidable on the handle and having rearward of said tongue a U-shaped head the forward edges of which have shoulders and are beveled beneath the same.

8. The combination with a utensil having a slotted lip the opposite edges of which are bent upwardly, of a handle having an offset tongue fitted in the slot and between the edges of the lip, and a spring-pressed bolt on the handle engaging the undersurface of the lip.

In testimony whereof I have affixed my signature.

THOMAS O. DUGGER.